United States Patent Office 2,698,266
Patented Dec. 28, 1954

2,698,266

MATERIAL FOR TREATING METAL SURFACES TO IMPROVE CORROSION RESISTANCE AND PAINT BONDING ABILITY

James H. Thirsk, Wyncote, Pa., assignor to American Chemical Paint Company, Ambler, Pa., a corporation of Delaware No Drawing. Application July 2, 1951,
Serial No. 234,906

2 Claims. (Cl. 148—6.2)

This invention relates to the art of coating metal and is particularly useful in the art of coating aluminum and alloys thereof in which aluminum is the principal ingredient. Although having a somewhat broader applicability, as will further appear, the invention has been developed in connection with aluminum coating processes which involve the production of an apparently amorphous coating which consists principally of phosphates. For this reason the disclosure of the present application will be exemplified by the treatment of aluminum.

It has been known to those skilled in this art that aluminum surfaces can be improved as to their corrosion resistance and paint bonding ability if they are coated by subjecting them to the action of an acid aqueous solution, the essential coating-producing ingredients of which are soluble fluorides, dichromates and acids from the class consisting of phosphoric and arsenic acid. Coating treatments of this kind are fully described and claimed in U. S. Patents 2,438,877; 2,471,909; 2,494,910; 2,472,864 and 2,678,291. In the several disclosures just mentioned, various methods and materials are described for the coating of aluminum by treating it with acid aqueous solutions of the nature above specified. All of these processes produce on aluminum a coating which apparently is amorphous in nature and consists principally of phosphates.

The present invention stems from the discovery that aluminum surfaces which are so coated may have their resistance to corrosion substantially improved if the coated surfaces are subsequently treated with certain aqueous solutions to be described below and the principal object of the present invention is to so improve such coated aluminum surfaces. Another object is to provide a method for treating such coated aluminum surfaces which will permit a much greater tolerance to wider variations in the coating solutions heretofore familiar to those skilled in the art—for example, those disclosed in the above referred to references. A concomitant object of the present invention is to make it possible to practice the prior coating procedures with somewhat less exactitude and care, and therefore, with less experienced personnel which, of course, results in a corresponding decrease in the costs of the coating operation. The present invention also has for an object the provision of a method which minimizes the tendency of the coated surface to be covered by a powder which has heretofore been characteristic of some of the coatings produced by prior procedures unless the processes are operated with a great deal of care and exactitude.

By way of examples of coatings produced by previous methods upon which coatings my present invention is particularly useful, we wish to cite the following. For example, a coating may be produced by means of a solution which is formulated in accordance with

*Formula No. I*

| | Grams |
|---|---|
| Sodium fluoride | 5 |
| Chromic acid ($CrO_3$) | 10 |
| Phosphoric acid, 75% | 64 |
| Water to make 1 liter | |

A coating may be obtained by immersing the aluminum surface in the foregoing solution or by flowing or spraying the solution upon the work or by any other convenient technique familiar to the art in which the solution is brought into contact with all portions of the surface of the metal and allowed to act thereon until the coating is produced. The time required to produce the coating will vary, of course, with the temperature. At ordinary living temperatures (70–80° F.) it may require as much as five to ten minutes to produce an appreciable coating with the above solution but this time can be substantially reduced, say, to as little as one or two minutes or even less by suitably heating the solution. If the period of contact between the solution and the surface is relatively short, after which an adhering film of solution is to be permitted to act for some time, it may be desirable to use a solution which is considerably more concentrated than that given in the above formula.

Other representative formulae for various coating solutions of the nature disclosed in the above referred to patents and application are as follows:

*Formula No. II*

| | Grams |
|---|---|
| Phosphoric acid, 75% | 64 |
| Sodium fluoride | 1.34 |
| Chromic acid ($CrO_3$) | 10 |
| Sodium chloride | 1 |
| Water to make 1 liter | |

*Formula No. III*

| | Grams |
|---|---|
| Sodium fluoride | 5 |
| Chromic acid ($CrO_3$) | 10 |
| Phosphoric acid, 75% | 61 |
| Arsenic acid | 2 |
| Water to make 1 liter | |

*Formula No. IV*

| | Grams |
|---|---|
| Sodium fluoride | 5.0 |
| Chromic acid ($CrO_3$) | 10.0 |
| Arsenic acid | 92.5 |
| Water to make 1 liter | |

After treatment with any of the typical solutions described above or with other coating solutions of a similar nature, which are commercially available from several manufacturers, the coated surface may be rinsed with water and then treated in accordance with the present invention or the method of the present invention may be applied without a prior rinse of water. The solutions used in carrying out the present invention may be applied by dipping the work into the solution or by spraying or flowing the solution over the surface or by means of any other convenient technique by which the solution can be brought into contact with the coated surface.

The treatment of the present method involves the use of a cerium nitrate in a solution of chromic acid and we have found that the following proportions should be observed for best results. The chromic acid must be present in an amount between 0.04 and 12 grams per liter, as free acid and preferably between 0.4 and 4 grams per liter. The cerium nitrate must be present in an amount from 0.02 to 6 grams per liter, and preferably between 0.2 and 2 grams per liter.

The form in which the cerium nitrate is introduced into the solution makes no difference as we have found that $Ce(NO_3)_4$ and $Ce(NO_3)_3$ may be used.

Within the teachings of the preferred ranges given above, a suitable treating solution may be prepared in accordance with the following formula.

*Formula No. V*

| | Grams |
|---|---|
| Chromic acid ($CrO_3$) | 4 |
| Ceric nitrate ($Ce(NO_3)_4$) | 2 |
| Water to make 1 liter | |

As the presence of any considerable amount of extraneous dissolved salts has been found undesirable, in that the corrosion resistance of the treated surface tends to decline with a salt build-up in the bath, we find it desirable to rinse the coated work in ordinary tap water before giving it the treatment with the materials of Formula No. V. This is especially true where it is desirable to secure optimum results.

Aluminum surfaces which have been coated by means of solutions similar to the coating solutions previously described and then given a subsequent rinse in dilute acidulated chromic acid solution, seldom withstand successfully over 168 hours exposure in a standard ASTM salt fog cabinet. However, when such coated surfaces are treated with solutions of the present invention, rather than the dilute acidulated chromic acid rinse, an exposure in a standard ASTM salt fog cabinet of 200 hours and even more without failure, is not at all uncommon.

While my improved bath is especially beneficial when used in accordance with the foregoing disclosure, its utility is not limited to this field because I have found that it has proven to be extremely meritorious in processes involving the use of solutions which form crystalline phosphate coatings on metal surfaces where the bath of the present invention has proven to be an excellent final treatment and can be substituted for the conventional dilute acidulated rinsing solutions heretofore familiar to the art.

I claim:

1. An aqueous metal treating bath consisting of water, chromic acid, and cerium nitrate, said chromic acid being present in an amount of from 0.04 to 12 grams per liter and the cerium nitrate being present in an amount of from 0.02 to 6 grams per liter.

2. The metal treating bath of Claim 1 in which the concentration of chromic acid is from 0.4 to 4 grams per liter and the cerium nitrate is from 0.2 to 2 grams per liter.

References Cited in the file of this patent

UNITED STATES PATENTS

| Number | Name | Date |
|---|---|---|
| 1,838,633 | Pacz | Dec. 29, 1931 |
| 2,067,215 | Tanner | Jan. 12, 1937 |
| 2,127,202 | Boyle | Aug. 16, 1938 |
| 2,233,422 | Lodeesen | Mar. 4, 1941 |
| 2,293,779 | Tanner | Aug. 25, 1942 |
| 2,301,983 | Tanner | Nov. 17, 1942 |
| 2,329,065 | Lum | Sept. 7, 1943 |
| 2,563,430 | Spruance, Jr. | Aug. 7, 1951 |
| 2,563,431 | Spruance, Jr. | Aug. 7, 1951 |
| 2,568,936 | Spruance | Sept. 25, 1951 |